United States Patent Office 3,415,155
Patented Dec. 10, 1968

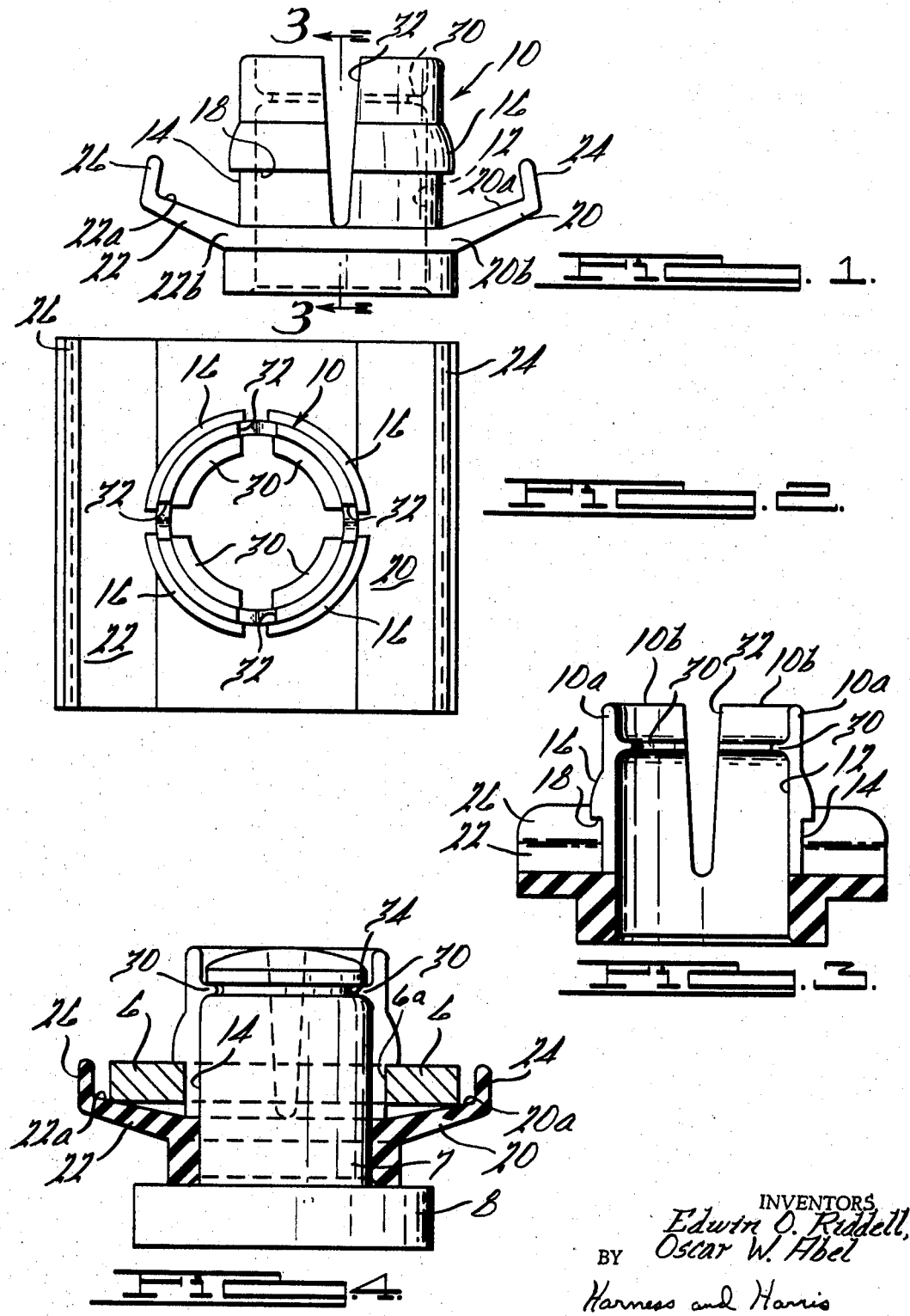

3,415,155
BUSHING
Edwin O. Riddell, Detroit, and Oscar W. Abel, Royal Oak, Mich., assignors to Chrysler Corporation, Highland Park, Mich., a corporation of Delaware
Filed Aug. 1, 1966, Ser. No. 569,350
4 Claims. (Cl. 85—80)

ABSTRACT OF THE DISCLOSURE

A bushing formed of a suitable plastics material and including resilient ears projecting radially outwardly from the main body portion of the bushing adjacent one end of the latter and a radial shoulder on the bushing adjacent the other end of the latter, the ears and shoulder coacting upon insertion of the bushing into an aperture in a first member to positively snap the bushing into that member and the main body portion further including a central cylindrical bore having an annular inwardly projecting ridge which snappingly receives an annular groove on a pin carried by a second member to be jointed to the first member.

---

This invention relates to a bushing for providing a pivotal interconnection between two links. More particularly, it relates to a bushing for providing a pivotal interconnection between a first link member and a pin carried by a second link member. One use for the bushing of the invention is to provide the pivotal interconnection between the various links of the windshield wiper mechanism of a motor vehicle.

It is an object of the present invention to provide an improved bushing.

A more specific object is to provide a bushing which is especially suitable for use as the pivotal interconnection between two link members.

Another object is to provide a bushing which is reliable in operation yet inexpensive to produce.

Yet another object is to provide a bushing which is extremely durable.

Still another object is to provide a bushing which provides a firm, shake resistant pivotal interconnection between two link members.

Yet another object is to provide a bushing which may be easily and quickly assembled to the link members.

The bushing of the invention is adapted to provide a pivotal interconnection between a first link member and a pin carried by a second link member. The bushing includes a main body portion in the form of a sleeve having a generally cylindrical internal surface and defining a cylindrical surface at its external periphery. Means are also provided to define a shoulder surface extending radially outwardly from the aforesaid external cylindrical surface at one end of the latter and two diametrically opposed ear portions projecting radially outwardly from the main body portion adjacent the other end of the aforesaid external cylindrical surface. Each of the ear portions slopes toward the shoulder surface and is bent over at its free end to provide a flange extending toward the shoulder surface.

An internal annular rib is also provided on the aforesaid internal cylindrical surface of the main body portion.

To assemble the bushing to the first and second link members, the bushing is forcefully inserted into a hole adjacent one end of the first link member to snap the shoulder surface over one edge of the hole. The ear portions have a radial extent, and an axial spacing from the shoulder surface, such that the first link member engages the ear portions immediately inboard of the flanges during insertion of the bushing to resiliently flex the ear portions and position the flanges in flanking relation to the side edges of the first link member adjacent the hole, whereby to preclude rotation of the bushing relative to the first link member. The pin on the second link member may be thereafter pressed into the main body sleeve portion to snap a circumferential groove provided in the end of the pin over the aforesaid internal rib, whereby to provide a pivotal interconnection between the first and second link members.

These and other objects, features and advantages of the invention will be apparent from the following detailed description of a preferred embodiment of the invention and from the accompanying drawing wherein:

FIG. 1 is a side elevational view of a bushing according to the invention;

FIG. 2 is a top view of the bushing of FIG. 1;

FIG. 3 is a cross sectional view taken on line 3—3 of FIG. 1; and

FIG. 4 is a view showing the bushing of the invention in assembled relation to first and second link members pivotally interconnected thereby.

The bushing of the invention is adapted to provide a pivotal interconnection between a first link member 6 and a pin or stud 7 carried by a second link member 8. The bushing preferably comprises a molded one-piece part formed of a resilient plastic material. The bushing includes a main body portion 10 in the form of a sleeve having a generally cylindrical internal surface 12 and defining a cylindrical surface 14 at its external periphery. The outer periphery of main body portion 10 is built up at 16 to provide an annular shoulder surface 18 extending radially outwardly from the cylindrical surface 14 at the upper end of the latter.

The bushing further includes ear portions 20, 22 projecting radially outwardly from main body portion 10 adjacent the lower end of external cylindrical surface 14. Ear portions 20, 22 slope upwardly and terminate in a flange or tip portion 24, 26. In the relaxed configuration of ear portions 20, 22, and by virtue of the upward slope of the ear portions, a radially outer section 20a, 22a lies axially closer to shoulder surface 18 than the juncture 20b, 22b of the ear portions and the main body portion; sections 20a, 22a are also spaced axially from shoulder surface 18 by a distance less than the thickness of first link member 6.

The bushing further includes an internal annular rib 30 on the internal cylindrical surface 12. The internal annular rib 30 is provided adjacent the upper end of main body portion 10 but spaced somewhat below that upper end to leave a cylindrical body portion 10a above rib 30. Main body portion 10 also includes a plurality of vertical slots 32 which begin adjacent the ear portions 20, 22 and flair upwardly to open at the upper end of main body portion 10. Slots 32 divide the upper portion of main body sleeve portion 10 into a plurality of circumferentially spaced prongs or fingers 10b. It will be understood that slots 32 also divide built up shoulder portion 16 into a plurality of circumferentially spaced shoulder sections and divide internal rib 30 into a plurality of circumferentially spaced rib sections.

To assemble the bushing to the link members, the bushing is forcefully inserted upper end first into a hole 6a provided in first link member 6. As the bushing is pushed upwardly into hole 6a, the slots 32 allow the fingers 10b to collapse inwardly to permit built up portion 16 to pass through hole 6a, whereafter fingers 10b snap back to snap shoulder surface 18 over the top edge of hole 6a. During this inserting movement of the bushing, the lower face of first link member 6 engages ear portion sections 20a and 22a to bias the ear portions downwardly about the pivotal axis defined by their junctures 20b, 22b with the main body portion. With the bushing snapped into position in hole 6a, ears 20 and 22 press upwardly on link member 6 to maintain that member in firm contact with shoulder surface 18, whereby to preclude axial movement of the bushing relative to link member 28, and flanges 24, 26 lie in flanking relation to the opposite side edges of link member 6 to preclude rotation of the bushing relative to the link member. Following insertion of the bushing into hole 6a, the pin or stud 7 on second link member 8 is pressed upwardly into the lower end of main body portion 10 to force fingers 10b radially outwardly and snap a circumferential groove 34 provided adjacent the upper end of pin 7 over internal rib 30.

In assembled relation, as seen in FIG. 4, the bushing provides a positive and durable pivotal interconnection between the two link members. The bushing may be disassembled from the links 6, 8 by inserting the tip of a thumb or a suitable expander tool into upper main body portion 10a to spread fingers 10b outwardly and withdraw rib 30 from groove 34 to allow withdrawal of pin 7 and link 8. Fingers 10b may then be squeezed radially inwardly to allow built up section 16 to pass through hole 6a to separate the bushing from link member 6.

We claim:

1. A bushing for providing a pivotal interconnection between a first member and a pin defined by a second member comprising:
   (a) a main body portion in the form of a sleeve having a generally cylindrical internal surface and defining a cylindrical surface at its external periphery;
   (b) means defining a shoulder surface extending radially outwardly from said external cylindrical surface at one end of the latter and lying in a plane generally at right angles to the longitudinal axis of said main body portion;
   (c) two diametrically opposed ear portions projecting radially outwardly from said main body portion adjacent the other end of said external cylindrical surface, each of said ear portions sloping toward said one end of said external cylindrical surface and being bent over at its free end to provide a flange extending toward said one end of said external cylindrical surface, said bushing being adapted to be forcefully inserted into a circular hole in said first member to snap said shoulder surface over one edge of said hole, said ear portions having a radial extent, and an axial spacing from said shoulder surface, such that said first member engages said ear portions immediately inboard of said flanges during insertion of said bushing to resiliently flex said ear portions and position said flanges in flanging relation to the side edges of said first member adjacent said hole to preclude rotation of said bushing relative to said first member; and
   (d) an internal annular rib on said internal cylindrical surface, whereby the pin on said second member may be pressed into said main body portion to snap a circumferential groove provided adjacent the end of said pin over said internal rib to thereby provide a pivotal interconnection between said first member and said pin.

2. A bushing according to claim 1 wherein:
   (e) said one end of said external cylindrical surface is the end thereof nearest one end of said main body sleeve portion; and
   (f) axially extending slots are provided in said main body sleeve portion, each of said slots extending from a location between said shoulder surface and the other end of said main body sleeve portion and opening at said one end of the latter.

3. A bushing according to claim 2 wherein said internal annular rib is adjacent said one end of said main body sleeve portion.

4. A bushing according to claim 3 wherein said internal annular rib is located between said one end of said main body sleeve portion and said shoulder surface.

References Cited

UNITED STATES PATENTS

| | | | |
|---|---|---|---|
| 2,943,373 | 7/1960 | Rapata | 85—80 |
| 3,001,007 | 9/1961 | Klumpp et al. | 16—2 |
| 3,033,624 | 5/1962 | Biesecker | 85—82 |
| 3,182,544 | 5/1965 | Rapata | 85—80 |
| 3,200,694 | 8/1965 | Rapata | 85—82 |
| 3,231,300 | 1/1966 | Moroney | 85—80 |
| 3,251,103 | 5/1966 | Saut. | |
| 3,298,754 | 1/1967 | Riester | 308—238 |

MARION PARSONS, JR., Primary Examiner.

U.S. Cl. X.R.

85—83; 308—238; 24—73; 287—93